United States Patent [19]

Mitchell

[11] Patent Number: 4,642,534
[45] Date of Patent: Feb. 10, 1987

[54] MAGNETIC DRIVEN MOTOR

[76] Inventor: Emile Mitchell, 3315 Dragonwick, Houston, Tex. 77030

[21] Appl. No.: 754,974

[22] Filed: Jul. 15, 1985

[51] Int. Cl.⁴ .............................................. H02P 6/02
[52] U.S. Cl. .................................... 318/138; 318/254; 318/439
[58] Field of Search ................... 318/138, 254 A, 254, 318/439

[56] References Cited

U.S. PATENT DOCUMENTS

| | | | |
|---|---|---|---|
| 2,492,435 | 12/1949 | Ostline | 318/254 |
| 4,496,887 | 1/1985 | Ichihara et al. | 318/254 |
| 4,499,407 | 2/1985 | Macleod | 318/254 |
| 4,504,751 | 3/1985 | Meier | 318/254 X |
| 4,553,075 | 11/1985 | Brown et al. | 318/254 |

FOREIGN PATENT DOCUMENTS 58-12565  1/1983  Japan ................................. 318/254

Primary Examiner—William M. Shoop, Jr.
Assistant Examiner—Bentsu Ro
Attorney, Agent, or Firm—Ranseler O. Wyatt

[57] ABSTRACT

A motor having a rotor, said rotor being rotated by magnetic force, and having a novel switch for turning on and off an electrical field, and novel means for controlling said switch to provide a selected constant speed to said rotor, utilizing the attracting power and the repelling power of magnetic forces alternately.

7 Claims, 2 Drawing Figures

MAGNETIC DRIVEN MOTOR

BACKGROUND OF THE INVENTION

In the field of electrically powered motors, magnet powered rotors are common, however, they require a constant source of power, such as batteries, for direct current, or for alternating current such as in a household. Constant use soon exhausts the batteries, and in alternating current, results in increased power bills, and subjects the work to stoppage due to power failures in the area. It is an object of this invention to provide a portable motor, which may be operated by magnetic force assisted by either direct current or alternating current, which, when used with a direct current, such as provided by rechargeable batteries, will maintain the necessary power indefinitely.

SUMMARY OF THE INVENTION

A magnetic motor having a source of power and a coil selectively energized thereby, means for regulating the flow of electricity to said coil through a magnetic controlled switch mounted laterally of said coil, to create an electric field which will repel the adjacent magnet on a rotary having a series of evenly spaced magnets, and when the succeeding rotor magnet passes the switch, the elements of the switch part, breaking the electrical circuit to the coil and dispelling the the electrical field, and the next magnet is drawn by magnetic forces towards the core in the coil, and as the last mentioned magnet passes the switch elements, the switch again closes and again creates the electric field, applying a push to the passing magnet and as the space between the magnets on the rotor pass the switch, the switch opens and the action is repeated.

BRIEF DESCRIPTION OF THE PREFERRED EMBODIMENTS

Figure 1:
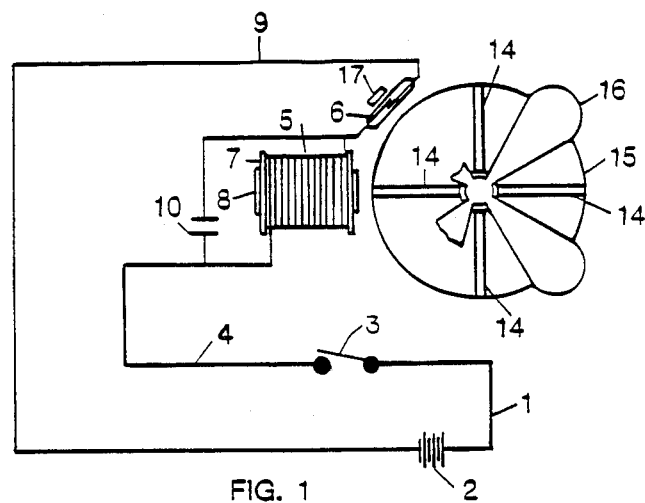
FIG. 1 is a schematic view of the electrical circuit employed, and showing a plan view of the rotor having fan blades attached.
Figure 2:
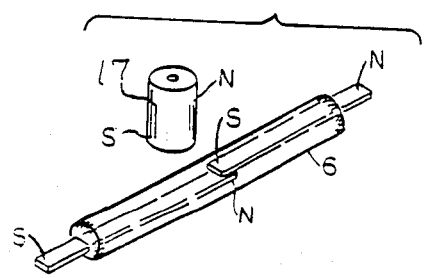
FIG. 2 is an enlarged view of the switch 6, and the control magnet 17.

In the drawings, the numeral 1 designates a current carrying wire leading from the batteries 2 to the off and on switch 3, which is shown in open position. The line 4 leads from the switch 3 to the coil 5 through the switch 6, which is a glass encased reed switch having two elements forming contact points. A coil is formed by turns of wire in the usual manner of forming a coil and one end of the wire from the coil is attached to one element of the switch 6, said switch being mounted on the coil spool 7, which in turn is mounted on the iron core 8 and said switch is positioned laterally of the said core 8. The wire 9 attached to the other element of the switch 6 forms a return line to the batteries. A capacitor 10 is mounted across the lines 1, 9 and acts as a spark arrester, and smooths the flow of current to the coil 5 and upon reaching its capacity, returns a charge of electricity to the batteries to maintain same charged. The glass enclosed elements are sealed in a vacuum, and thus will not spark upon contact, greatly extending their useful life as a switch.

Magnets 14, 14 are mounted on the rotor 15 and are evenly spaced apart with the north pole thereof at the periphery of the rotor. Blades 16 may be mounted on the rotor 15 to provide a fan to be rotated by the rotor. Any other suitable type of workload may be attached to the rotor.

The switch 6 has two contact elements, the contacting ends of which are magnetically active and have the usual polarity, that is, the north polar end is the extended end of one of these elements, with the abutting end of the other element being its south polar end. When the magnet 17 draws the abutting ends of these elements together, the switch 6 is closed, the flow of electrical current is through the switch 3 from line 1 to line 4, and to the coil 5 through the said switch 6, where the coil 5 and core 8 will set up an electrical field. The switch 3 is normally closed, and the flow of electric current is through line 1 and switch 3 and line 4 and reed switch 6 to the coil 5 where the coil 5 and core 8 will set up an electrical field, with the circuit being completed through the line 9 to the battery 2. A capacitor 10 is mounted in the line 9 to smooth the flow and to send a charge to the battery to prolong its useful life. The switch 6 is controlled by the adjustable magnet 17, which maintains the contact points in the reed switch 6 at the desired gap, the greater the gap, the slower the speed of rotation, with a maximum speed when the center of the north pole of the magnet 17 is in alignment with the north pole of the uppermost element in the reed switch 6.

As the rotor rotates, a magnet 14 moves into the range of the electric field created when the gap of the reed switch 6 is closed. The north pole of the magnet is in the periphery of the rotor and will be drawn to the iron core of the electric field area when the magnetic action of the approaching magnet 14 acts on the uppermost element of the switch 6, opening the gap, and dispelling the electric field. As that magnet passes the contact points, the magnet 17, acting on the uppermost element of the switch 6, closes the switch, again activating the electric field, which will repel that magnet 14, continuing its rotation, and as the succeeding magnet moves into range, it will open the gap in the contact points, and the action repeated.

The magnet 17 may be adjusted to change the polar arrangement thereof with relation to the contact points of the switch 6, which will, in turn alter the speed of rotation of the rotor by changing the size of the gap in the contact points. A direct north pole to north pole relation of magnet 17 to switch 6 assuring a small gap and a fast rotation. There is no dead space in the rotor. As the space between the magnets 14 pass the switch 6, the magnet 17 will close the gap between the contact points to initiate the electric field, which repels and pushes the passing magnet in the direction it is traveling and the magnetic action drawing the approaching magnet to the iron core, upon the passing magnet opening the gap between the contact points, continues the rotation.

The control magnet 17 may be rotated to adjust the action on the switch, rotating same away from direct north polar of the switch with relation to north polar of the element, greatly reducing the pull of the electrical field of the coil, and thus reducing the speed of the rotor, and upon complete rotation resulting in a change of polarity to south, the direction of rotation of the rotor will be reversed, by rotation of the knob 18.

Rotation of the rotor will continue as long as the switch 3 is closed, until a carbon build up on the elements of the switch 6 require a change of elements or until the batteries become exhaused.

What I claim is:

1. A brushless DC motor comprising a source of electrical energy a first conductor leading therefrom to a coil, a rotor having magnets and cooperating with said coil, a glass enclosed switch adjacent said rotor, a second conductor connected to said coil and to said source of electrical energy through said glass enclosed switch creating a closed electrical circuit, said glass enclosed switch having magnetized contact points and gap, the poles of said magnetized contact points adapted to be attracted or repelled by said rotor magnets to control the rotation of said rotor, an adjustable magnet mounted adjacent said switch to alter the gap of said magnetized contact points to control the speed and direction of said rotor.

2. A brushless DC motor as defined in claim 1 wherein said source of electrical energy is batteries or solar cells.

3. A brushless DC motor as defined in claim 1, further having a spark arrester connected across said coil.

4. A brushless DC motor as defined in claim 3 wherein said spark arrester is a capacitor, said capacitor being used to smooth the current flow through said coil and further to arrest spark in said glass enclosed switch.

5. A brushless DC motor as defined in claim 4, said capacitor prolonging the life of said electrical energy source.

6. A brushless DC motor as defined in claim 1 wherein said glass enclosed switch is a magnetized reed switch.

7. A brushless DC motor as defined in claim 6, wherein said adjustable magnet is mounted in front of said magnetized reed switch, said adjustable magnet being rotatable to vary the magnet polarity facing said magnetized reed switch to control the direction and speed of said rotor.

* * * * *